US 12,462,581 B2

United States Patent
Sachdeva et al.

(10) Patent No.: US 12,462,581 B2
(45) Date of Patent: Nov. 4, 2025

(54) SYSTEMS AND METHODS FOR TRAINING A NEURAL NETWORK FOR GENERATING A REASONING STATEMENT

(71) Applicants: Honda Motor Co., Ltd., Tokyo (JP); The Board of Trustees of the Leland Stanford Junior University, Stanford, CA (US)

(72) Inventors: Enna Sachdeva, San Jose, CA (US); Nakul Agarwal, San Francisco, CA (US); Sean F. Roelofs, Soquel, CA (US); Jiachen Li, Mountain View, CA (US); Behzad Dariush, San Ramon, CA (US); Chiho Choi, San Jose, CA (US)

(73) Assignees: Honda Motor Co., Ltd., Tokyo (JP); The Board of Trustees of the Leland Stanford Junior University, Stanford, CA (US)

( * ) Notice: Subject to any disclaimer, the term of this patent is extended or adjusted under 35 U.S.C. 154(b) by 337 days.

(21) Appl. No.: 18/328,921

(22) Filed: Jun. 5, 2023

(65) Prior Publication Data
US 2024/0404297 A1    Dec. 5, 2024

(51) Int. Cl.
*G06V 20/58* (2022.01)
*G06V 10/778* (2022.01)
(Continued)

(52) U.S. Cl.
CPC .......... *G06V 20/58* (2022.01); *G06V 10/7788* (2022.01); *G06V 10/82* (2022.01)

(58) Field of Classification Search
USPC ............ 382/103–104, 155–156, 159; 706/20
See application file for complete search history.

(56) References Cited

U.S. PATENT DOCUMENTS 11,205,082 B2 * 12/2021 Adeli-Mosabbeb ... G06V 10/82
11,769,318 B2 *  9/2023 Frtunikj ................. G06V 20/56
                                                      382/155

(Continued)

OTHER PUBLICATIONS

Fu-Hsiang Chan, Yu-Ting Chen, Yu Xiang, and Min Sun. Anticipating accidents in dashcam videos. In Asian Conference on Computer Vision, pp. 136-153. Springer, 2016.

(Continued)

*Primary Examiner* — Ishrat I Sherali
(74) *Attorney, Agent, or Firm* — Rankin, Hill & Clark LLP

(57) ABSTRACT

Systems and methods for training a neural network for generating a reasoning statement are provided. In one embodiment, a method includes receiving sensor data from a perspective of an ego agent. The method includes identifying a plurality of captured objects in the at least one roadway environment. The method includes receiving a set of ranking classifications for a captured object of the plurality of captured objects. The annotator reasoning statement is a natural language explanation for the applied attribute. The method includes generating a training dataset for the object type including the annotator reasoning statements of the set of ranking classifications that include the applied attribute from the plurality of importance attributes in the importance category. The method includes training the neural network to generate a generated reasoning statement based on the training dataset in response to a training agent detecting a detected object of the object type.

20 Claims, 8 Drawing Sheets

(51) Int. Cl.
        *G06V 10/82*      (2022.01)
        *G06V 20/56*      (2022.01)

(56)                References Cited

U.S. PATENT DOCUMENTS

| | | | |
|---|---|---|---|
| 12,216,475 B2* | 2/2025 | Li | B60W 60/0027 |
| 2019/0189159 A1* | 6/2019 | Gan | G06F 16/252 |
| 2020/0250437 A1* | 8/2020 | Rahimpour | G05D 1/0214 |
| 2021/0043002 A1* | 2/2021 | Zeng | G06T 7/74 |
| 2022/0230021 A1* | 7/2022 | Muehlenstaedt | G06V 10/764 |
| 2023/0230484 A1* | 7/2023 | Al Faruque | G06V 10/82 |

OTHER PUBLICATIONS

Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Qiang Li, Chunsheng Liu, Faliang Chang, Shuang Li, Hui Liu, and Zehao Liu. Adaptive short-temporal induced aware fusion network for predicting attention regions like a driver. IEEE Transactions on Intelligent Transportation Systems, 23(10):18695-18706, 2022.
Tsung-Yi Lin, Piotr Dollár, Ross Girshick, Kaiming He, Bharath Hariharan, and Serge Belongie. Feature pyramid networks for object detection. In Proceedings of the IEEE conference on computer vision and pattern recognition, pp. 2117-2125, 2017.
Eshed Ohn-Bar and Mohan Manubhai Trivedi. Are all objects equal? deep spatio-temporal importance prediction in driving videos. Pattern Recognition, 64:425-436, 2017.
Partners for Automated Vehicle Education. Pave poll 2020. https://pavecampaign.org/wpcontent/uploads/2020/05/PAVE-Poll Fact-Sheet.pdf, 2020.
Tong Wu, Enna Sachdeva, Kumar Akash, Xingwei Wu, Teruhisa Misu, and Jorge Ortiz. Toward an adaptive situational awareness support system for urban driving. In 2022 IEEE Intelligent Vehicles Symposium (IV), pp. 1073-1080. IEEE, 2022.
Kelvin Xu, Jimmy Ba, Ryan Kiros, Kyunghyun Cho, Aaron Courville, Ruslan Salakhudinov, Rich Zemel, and Yoshua Bengio. Show, attend and tell: Neural image caption generation with visual attention. In International conference on machine learning, pp. 2048-2057. PMLR, 2015.
Zehua Zhang, Ashish Tawari, Sujitha Martin, and David Crandall. Interaction graphs for object importance estimation in on-road driving videos. In 2020 IEEE International Conference on Robotics and Automation (ICRA), pp. 8920-8927. IEEE, 2020.
Peter Anderson, Xiaodong He, Chris Buehler, Damien Teney, Mark Johnson, Stephen Gould, and Lei Zhang. Bottom-up and top-down attention for image captioning and visual question answering. In Proceedings of the IEEE conference on computer vision and pattern recognition, pp. 6077-6086, 2018.
Satanjeev Banerjee and Alon Lavie. Meteor: An automatic metric for mt evaluation with improved correlation with human judgments. In Proceedings of the acl workshop on intrinsic and extrinsic evaluation measures for machine translation and/or summarization, pp. 65-72, 2005.
Keivan Borna and Reza Ghanbari. Hierarchical lstm network for text classification. SN Applied Sciences, 1:1-4, 2019.
Bo Dai, Sanja Fidler, Raquel Urtasun, and Dahua Lin. Towards diverse and natural image descriptions via a conditional gan. In Proceedings of the IEEE international conference on computer vision, pp. 2970-2979, 2017.
Thierry Deruyttere, Simon Vandenhende, Dusan Grujicic, Luc Van Gool, and Marie-Francine Moens. Talk2car: Taking control of your self-driving car. arXiv preprint arXiv:1909.10838, 2019.
Jacob Devlin, Ming-Wei Chang, Kenton Lee, and Kristina Toutanova. Bert: Pre-training of deep bidirectional transformers for language understanding. arXiv preprint arXiv:1810.04805, 2018.
Mingfei Gao, Ashish Tawari, and Sujitha Martin. Goal-oriented object importance estimation in on-road driving videos. In 2019 International Conference on Robotics and Automation (ICRA), pp. 5509-5515. IEEE, 2019.
Zhong Ji, Yuxiao Zhao, Yanwei Pang, Xi Li, and Jungong Han. Deep attentive video summarization with distribution consistency learning. IEEE transactions on neural networks and learning systems, 32(4):1765-1775, 2020.
Justin Johnson, Andrej Karpathy, and Li Fei-Fei. Densecap: Fully convolutional localization networks for dense captioning. In Proceedings of the IEEE conference on computer vision and pattern recognition, pp. 4565-4574, 2016.
Jinkyu Kim and John Canny. Interpretable learning for selfdriving cars by visualizing causal attention. In Proceedings of the IEEE international conference on computer vision, pp. 2942-2950, 2017.
Jinkyu Kim, Anna Rohrbach, Trevor Darrell, John Canny, and Zeynep Akata. Textual explanations for self-driving vehicles. In Proceedings of the European conference on computer vision (ECCV), pp. 563-578, 2018.
Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotations. International journal of computer vision, 123:32-73, 2017.
Chengxi Li, Stanley H Chan, and Yi-Ting Chen. Who make drivers stop? towards driver-centric risk assessment: Risk object identification via causal inference. In 2020 IEEE/RSJ International Conference on Intelligent Robots and Systems (IROS), pp. 10711-10718. IEEE, 2020.
Jiachen Li, Haiming Gang, Hengbo Ma, Masayoshi Tomizuka, and Chiho Choi. Important object identification with semi-supervised learning for autonomous driving. In 2022 International Conference on Robotics and Automation (ICRA), pp. 2913-2919. IEEE, 2022.
Wei-Hong Li, Fa-Ting Hong, and Wei-Shi Zheng. Learning to learn relation for important people detection in still images. In Proceedings of the IEEE/CVF Conference on Computer Vision and Pattern Recognition, pp. 5003-5011, 2019.
Chin-Yew Lin. Rouge: A package for automatic evaluation of summaries. In Text summarization branches out, pp. 74-81, 2004.
Srikanth Malla, Chiho Choi, Isht Dwivedi, Joon Hee Choi, and Jiachen Li. Drama: Joint risk localization and captioning in driving. arXiv preprint arXiv:2209.10767, 2022.
Kishore Papineni, Salim Roukos, Todd Ward, and Wei-Jing Zhu. Bleu: a method for automatic evaluation of machine translation. In Proceedings of the 40th annual meeting of the Association for Computational Linguistics, pp. 311-318, 2002.
Vasili Ramanishka, Yi-Ting Chen, Teruhisa Misu, and Kate Saenko. Toward driving scene understanding: A dataset for learning driver behavior and causal reasoning. In Proceedings of the IEEE Conference on Computer Vision and Pattern Recognition, pp. 7699-7707, 2018.
Rakshith Shetty, Marcus Rohrbach, Lisa Anne Hendricks, Mario Fritz, and Bernt Schiele. Speaking the same language: Matching machine to human captions by adversarial training. In Proceedings of the IEEE International Conference on Computer Vision, pp. 4135-4144, 2017.
Guolei Sun, Wenguan Wang, Jifeng Dai, and Luc Van Gool. Mining cross-image semantics for weakly supervised semantic segmentation. In Computer Vision-ECCV 2020: 16th European Conference, Glasgow, UK, Aug. 23-28, 2020, Proceedings, Part II 16, pp. 347-365. Springer, 2020.
Ramakrishna Vedantam, C Lawrence Zitnick, and Devi Parikh. Cider: Consensus-based image description evaluation. In Proceedings of the IEEE conference on computer vision and pattern recognition, pp. 4566-4575, 2015.
Oriol Vinyals, Alexander Toshev, Samy Bengio, and Dumitru Erhan. Show and tell: A neural image caption generator. In Proceedings of the IEEE conference on computer vision and pattern recognition, pp. 3156-3164, 2015.
Qingzhong Wang and Antoni B Chan. Describing like humans: on diversity in image captioning. In Proceedings of the IEEE/CVF Conference on Computer Vision and Pattern Recognition, pp. 4195-4203, 2019.

(56) References Cited

OTHER PUBLICATIONS

Yiran Xu, Xiaoyin Yang, Lihang Gong, Hsuan-Chu Lin, Tz-Ying Wu, Yunsheng Li, and Nuno Vasconcelos. Explainable object-induced action decision for autonomous vehicles. In Proceedings of the IEEE/CVF Conference on Computer Vision and Pattern Recognition, pp. 9523-9532, 2020.

Linjie Yang, Kevin Tang, Jianchao Yang, and Li-Jia Li. Dense captioning with joint inference and visual context. In Proceedings of the IEEE conference on computer vision and pattern recognition, pp. 2193-2202, 2017.

Yu Yao, Xizi Wang, Mingze Xu, Zelin Pu, Ella Atkins, and David Crandall. When, where, and what? a new dataset for anomaly detection in driving videos. arXiv preprint arXiv:2004.03044, 2020.

Guojun Yin, Lu Sheng, Bin Liu, Nenghai Yu, Xiaogang Wang, and Jing Shao. Context and attribute grounded dense captioning. In Proceedings of the IEEE/CVF Conference on Computer Vision and Pattern Recognition, pp. 6241-6250, 2019.

Zhou Yu, Jun Yu, Yuhao Cui, Dacheng Tao, and Qi Tian. Deep modular co-attention networks for visual question answering. In Proceedings of the IEEE/CVF conference on computer vision and pattern recognition, pp. 6281-6290, 2019.

Kuo-Hao Zeng, Shih-Han Chou, Fu-Hsiang Chan, Juan Carlos Niebles, and Min Sun. Agent-centric risk assessment: Accident anticipation and risky region localization. In Proceedings of the IEEE Conference on Computer Vision and Pattern Recognition, pp. 2222-2230, 2017.

Dave Zhenyu Chen, Angel X Chang, and Matthias Nießner. Scanrefer: 3d object localization in rgb-d scans using natural language. In Computer Vision-ECCV 2020: 16th European Conference, Glasgow, UK, Aug. 23-28, 2020, Proceedings, Part XX, pp. 202-221. Springer, 2020.

Zhenyu Chen, Ali Gholami, Matthias Nießner, and Angel X Chang. Scan2cap: Context-aware dense captioning in rgb-d scans. In Proceedings of the IEEE/CVF Conference on Computer Vision and Pattern Recognition, pp. 3193-3203, 2021.

* cited by examiner

SYSTEMS AND METHODS FOR TRAINING A NEURAL NETWORK FOR GENERATING A REASONING STATEMENT

BACKGROUND

Understanding of visual scenes is an important prerequisite for efficient navigation of autonomous agents and advanced driver assistance systems, especially in complex and highly crowded urban scenarios. Due to the rapid advancement in the field of machine learning and computer vision, much progress has been made in the area of visual scene understanding of complex traffic scenarios. However, despite this significant advancement in the development of autonomous agent technologies, public acceptance of these systems remains limited. A survey conducted by Partners for Automated Vehicle Education in 2020 reported that 60% of respondents have difficulty trusting autonomous agents because they did not understand underlying rationale of the autonomous agent technologies.

BRIEF DESCRIPTION

According to one aspect, a system for training a neural network for generating a reasoning statement is provided. The system includes a memory storing instructions that when executed by a processor cause the processor to receive sensor data having a number of frames imaging at least one roadway environment from a perspective of an ego agent. The system also includes a memory storing instructions that when executed by a processor cause the processor to identify a plurality of captured objects in the at least one roadway environment from the number of frames. The system further includes a memory storing instructions that when executed by a processor cause the processor to receive a set of ranking classifications for a captured object, having an object type, of the plurality of captured objects. A ranking classification of the set of ranking classifications includes an annotator reasoning statement and an applied attribute of a predetermined group of attributes including a plurality of importance attributes in an importance category and an unimportance attribute in an unimportance category. The annotator reasoning statement is a natural language explanation for the applied attribute. Each ranking classification is received from a different source of a plurality of sources. The system yet further includes a memory storing instructions that when executed by a processor cause the processor to generate a training dataset for the object type including the annotator reasoning statements of the set of ranking classifications that include the applied attribute from the plurality of importance attributes in the importance category. The system also includes a memory storing instructions that when executed by a processor cause the processor to train the neural network to generate a generated reasoning statement based on the training dataset in response to a training agent detecting a detected object of the object type.

According to another aspect, a computer-implemented method for training a neural network for generating a reasoning statement is provided. The computer-implemented method includes receiving sensor data having a number of frames imaging at least one roadway environment from a perspective of an ego agent. The computer-implemented method also includes identifying a plurality of captured objects in the at least one roadway environment from the number of frames. The computer-implemented method further includes receiving a set of ranking classifications for a captured object, having an object type, of the plurality of captured objects. A ranking classification of the set of ranking classifications includes an annotator reasoning statement and an applied attribute of a predetermined group of attributes including a plurality of importance attributes in an importance category and an unimportance attribute in an unimportance category. The annotator reasoning statement is a natural language explanation for the applied attribute. Each ranking classification is received from a different source of a plurality of sources. The computer-implemented method yet further includes generating a training dataset for the object type including the annotator reasoning statements of the set of ranking classifications that include the applied attribute from the plurality of importance attributes in the importance category. The computer-implemented method also includes training the neural network to generate a generated reasoning statement based on the training dataset in response to a training agent detecting a detected object of the object type.

According to a further aspect, a non-transitory computer readable storage medium storing instructions that when executed by a computer having a processor to perform a method for training a neural network for generating a reasoning statement is provided. The method includes receiving sensor data having a number of frames imaging at least one roadway environment from a perspective of an ego agent. The method also includes identifying a plurality of captured objects in the at least one roadway environment from the number of frames. The method further includes receiving a set of ranking classifications for a captured object, having an object type, of the plurality of captured objects. A ranking classification of the set of ranking classifications includes an annotator reasoning statement and an applied attribute of a predetermined group of attributes including a plurality of importance attributes in an importance category and an unimportance attribute in an unimportance category. The annotator reasoning statement is a natural language explanation for the applied attribute. Each ranking classification is received from a different source of a plurality of sources. The method yet further includes generating a training dataset for the object type including the annotator reasoning statements of the set of ranking classifications that include the applied attribute from the plurality of importance attributes in the importance category. The method also includes training the neural network to generate a generated reasoning statement based on the training dataset in response to a training agent detecting a detected object of the object type.

DETAILED DESCRIPTION

Figure 1A:
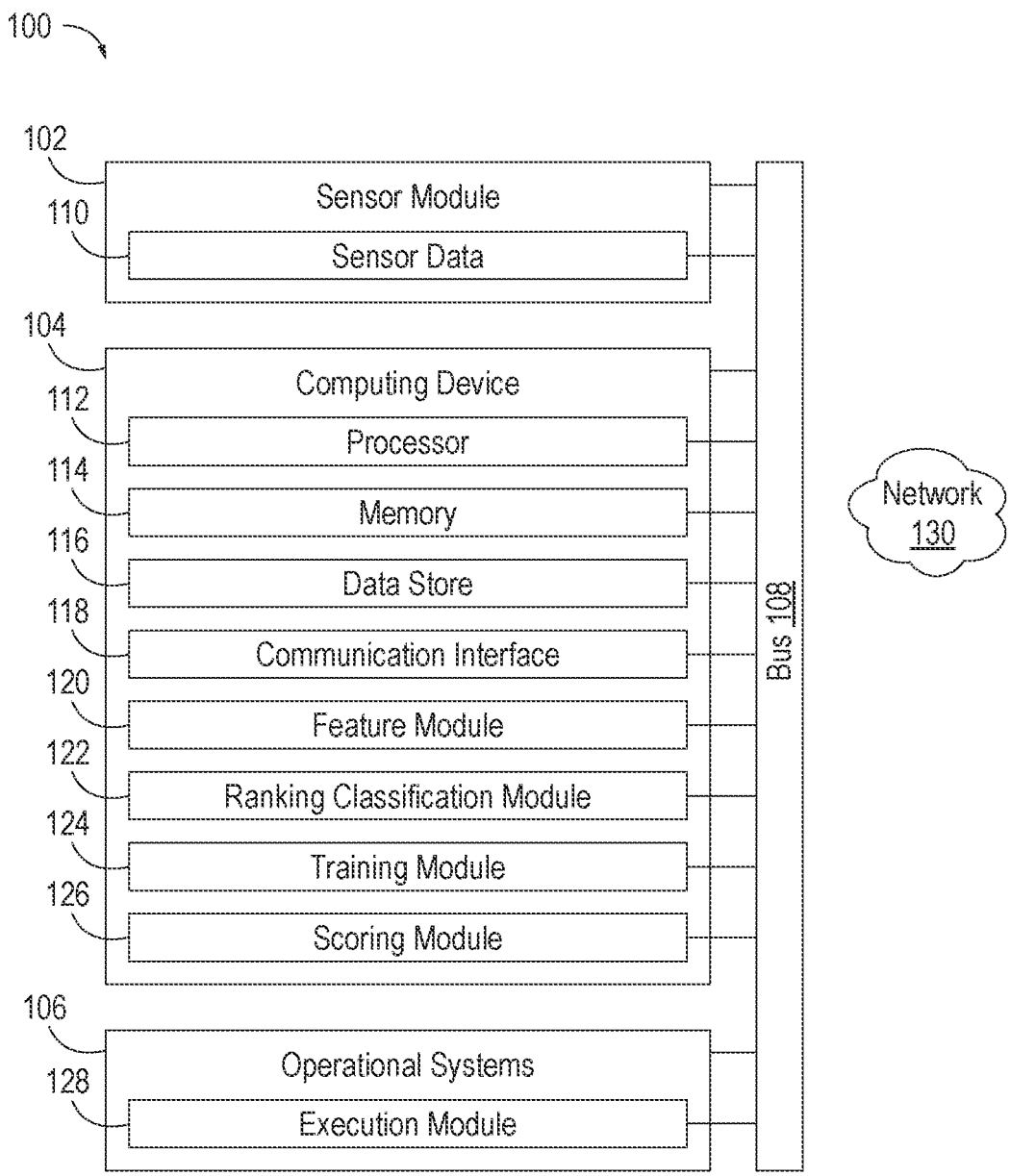
FIG. 1A is an exemplary component diagram of a system for training a neural network for generating a reasoning statement, according to one aspect.

As discussed above, the public has been reticent to accept autonomous agents due to a perceived lack of transparency. In order to establish trust, the systems and methods described herein train a neural network for generating a generated reasoning statement that is interpretable by humans. In particular, a training dataset with ranking classifications is generated based on temporal and relational annotations of objects that influence the ego agent's decision making. For example, the training dataset provides diverse natural language reasoning statements that provide an explanation of why a particular object is important. By expanding the training dataset to include annotator reasoning statements, the expanded training dataset is able to generate reasoning statements associated with object types of objects. The training dataset may be used to train a neural network of a training agent to provide reasoning statements that convey important decisions of the training agent thereby improving the situational awareness of users associated with the training agent and increasing user trust.

The ranking classifications also include an applied attribute from a predetermined group of attributes. The applied attribute defines the perceived level of importance of an object in the scene. In this manner, the applied attributes provide a standardized framework for defining the importance of an object. The training dataset may be based on the mathematical relationship between different applied attributes of the ranking classifications associated with the object and may generate the generated reasoning statements based on the different levels of importance. Thus, the systems and the methods described herein train a neural network to generate reasoning statements with the training dataset to improve the transparency and interpretability of the visual scene understanding modules of agent systems.

DEFINITIONS

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or operation. Exemplary systems include, but are not limited to: an electronic stability control system, an anti-lock brake system, a brake assist system, an automatic brake prefill system, a low speed follow system, a cruise control system, a warning system, a mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft.

I. System Overview

Referring now to the drawings, the drawings are for purposes of illustrating one or more exemplary embodiments and not for purposes of limiting the same. FIG. 1A is an exemplary component diagram of an operating environment for training a neural network for generating a reasoning statement, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 1B:
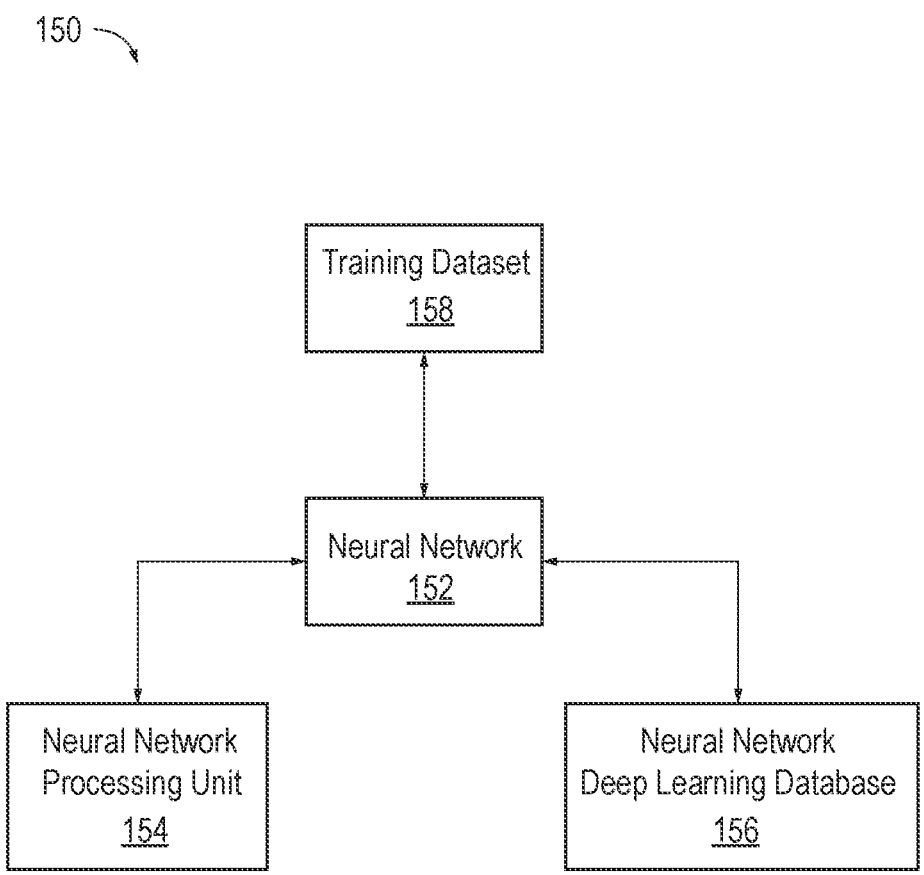
FIG. 1B is an exemplary component diagram of a neural network architecture for training a neural network for generating a reasoning statement, according to one aspect.
Figure 2:
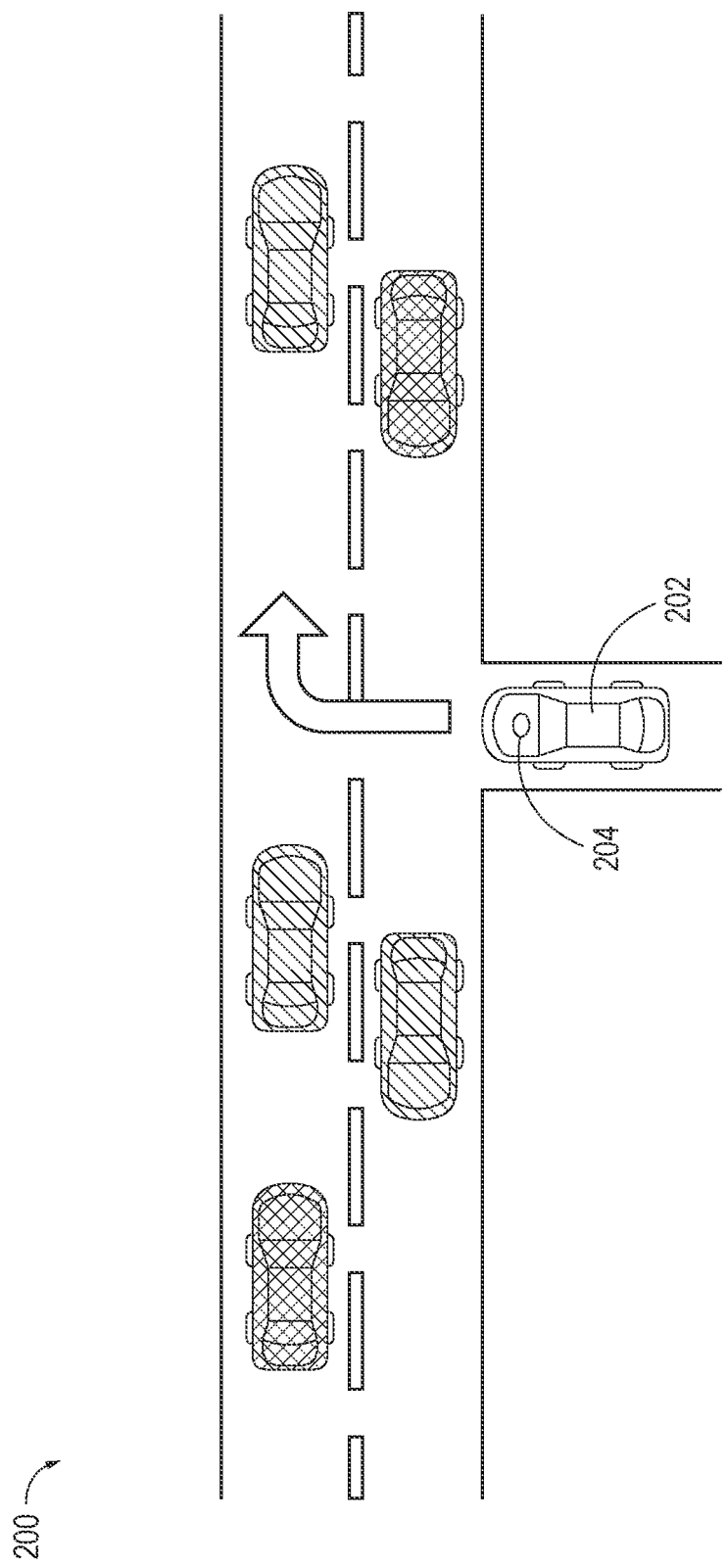
FIG. 2 is an exemplary agent environment of a system for training a neural network for generating a reasoning statement, according to one aspect.

The computing device 104 may be implemented as a part of an ego agent, such as the ego agent 202 of the at least one roadway environment 200, shown in FIG. 2 or a training agent. The training agent is an agent being trained using the operating environment 100. For clarity, the training agent will be described as the ego agent 202 such that the neural network 152, shown in FIG. 1B, is being used to train the ego agent 202. However, the ego agent 202 may be any agent or even software in execution in the operating environment 100. For example, as will be described in greater detail below, the operating environment 100 may include a training module 124 that includes a neural network architecture 150 of a system for training a neural network 152 of a remote training agent.

The ego agent 202 may be a bipedal, two-wheeled or four-wheeled robot, a vehicle, or a self-propelled machine. For example, in another embodiment, the ego agent 202 may be configured as a humanoid robot. The ego agent 202 may take the form of all or a portion of a robot. The computing device 104 may be implemented as part of a telematics unit, a head unit, a navigation unit, an infotainment unit, an electronic control unit, among others of the ego agent 202. In other embodiments, the components and functions of the computing device 104 may be implemented with other devices (e.g., a portable device) or another device connected via a network (e.g., a network 130) or using the neural network architecture 150.

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The ego agent 202 may include agent sensors for sensing objects and the at least one roadway environment 200. For example, the ego agent 202 may include an image sensor 204. The image sensor 204 may be a light sensor to capture light data from around the ego agent 202. For example, a light sensor may rotate 360 degrees around ego agent 202 and collect the sensor data 110 in sweeps. Conversely, an image sensor 204 may be omnidirectional and collect sensor data 110 from all directions simultaneously. The image sensor 204 of an agent may emit one or more laser beams of ultraviolet, visible, or near infrared light toward the surrounding environment of the ego agent 202. In some embodiments, the image sensor 204 may be a monocular camera.

The image sensor 204 may positioned on the ego agent 202. For example, suppose that the ego agent 202 is a vehicle. One or more agent sensors may be positioned at external front and/or side portions of the ego agent 202, including, but not limited to different portions of the vehicle bumper, vehicle front lighting units, vehicle fenders, and the windshield. Additionally, the agent sensors may be disposed at internal portions of the ego agent 202 including, in a vehicular embodiment, the vehicle dashboard (e.g., dash mounted camera), rear side of a vehicle rear view mirror, etc. The agent sensors may be positioned on a planar sweep pedestal (not shown) that allows the image sensor 204 to be rotated to capture images of the environment at various angles.

The image sensor 204 is associated with intrinsic parameters. The intrinsic parameters link the pixel coordinates of an image with corresponding coordinates in the camera reference frame. The intrinsic parameters identify the transformation between the camera reference frame and the world reference frame. For example, the intrinsic parameters may include the position, angle, field of view (FOV), location, etc. of the image sensor 204, the size of pixels in the image, and the orientation of the image sensor 204, among others.

Accordingly, the agent sensors, such as the image sensor 204, and/or the sensor module 102 are operable to sense a measurement of data associated with the ego agent 202, the operating environment 100, the at least one roadway environment 200, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module as an input image. Based on the location of the image sensor 204, the input image may be a perspective space image defined relative to the position and viewing direction of the ego agent 202. In some embodiments, a plurality of agent sensors may be used so that the sensor data 110 includes a wider FOV than the intrinsic parameters of a single sensor would allow. The sensor data 110 may include the video dataset having a number of frames from a plurality of agent sensors of the ego agent 202. Therefore, the sensor data 110 may include image data from multiple agent sensors stitched together to create a video dataset with a wider FOV than an individual agent sensor may provide.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a feature module 120, a ranking classification module 122, a training module 124, and a scoring module 126 enabled by the processor 112 for training a neural network 152 for generating a reasoning statement facilitated by the components of the operating environment 100 and the neural network architecture 150.

The feature module 120, the ranking classification module 122, the training module 124, and the scoring module 126, may be artificial neural networks that act as a framework for machine learning, including deep reinforcement learning, and may include the network architecture of FIG. 1B. The neural network 152 of the neural network architecture 150 may be a convolution neural network (CNN), a conditional generative adversarial network (cGAN) etc., or the individual feature module 120, the ranking classification module 122, the training module 124, and/or the scoring module 126 may include additional artificial networks as described below.

For example, the feature module 120, the ranking classification module 122, the training module 124, and the scoring module 126 may be a CNN. In one embodiment, the feature module 120, the ranking classification module 122, the training module 124, and/or the scoring module 126 may include a cGAN. One or more of the feature module 120, the ranking classification module 122, the training module 124, and the scoring module 126 may be a graphical representation neural network that is applied to graphical representation structures. In another embodiment, the feature module 120, the ranking classification module 122, the training module 124, and the scoring module 126 may include an input layer, an output layer, and one or more hidden layers, which may be convolutional filters. In some embodiments, one or more of the feature module 120, the ranking classification module 122, the training module 124, and the scoring module 126 may include Long Short Term Memory (LSTM) networks and LSTM variants (e.g., E-LSTM, G-LSTM, etc.).

In some embodiments, the one or more of the feature module 120, the ranking classification module 122, the training module 124, and the scoring module 126 may be implemented with the network architecture 150 shown in FIG. 1B. The network architecture 150 may be included in the feature module 120, the ranking classification module 122, the training module 124, and the scoring module 126. In another embodiment, the network architecture 150 may be stored in the data store 116 or stored remotely.

In one or more embodiments, the network architecture 150 includes a neural network 152 such as the neural networks described above. The neural network 152 may include a neural network processing unit 154 and a neural network deep learning database 156. The neural network processing unit 154 may be configured to utilize machine learning/deep learning to provide artificial intelligence capabilities that may be utilized to build and maintain the neural network deep learning database 156 with various types of data. The neural network processing unit 154 may process information that is provided as inputs and may utilize the neural network deep learning database 156 to access stored computer/machine learned data to provide various functions, that may include, but may not be limited to, object classification, feature recognition, computer vision, speed recognition, machine translation, autonomous driving commands, and the like. In one embodiment, the neural network 152 may be trained using a training dataset 158. Generally, the training dataset 158 includes information such as applied attributes and annotator reasoning statements to train the neural network 152 for generating a generated reasoning statement. The training dataset 158 is generated by the training module 124, described in greater detail below.

In one or more embodiments, the neural network deep learning database 156 may store road user classification data based on the sensor data 110 provided by the agent sensors. In some embodiments, one or more of the feature module 120, the ranking classification module 122, the training module 124, and the scoring module 126 may communicate with the neural network processing unit 154 to determine classification data based on the sensor data 110. The neural network processing unit 154 may analyze the sensor data 110 by utilizing the neural network deep learning database 156 to determine the classification(s) associated with the features of the sensor data 110.

The computing device 104 is also operably connected for computer communication (e.g., via the bus 108 and/or the communication interface 118) to one or more operational systems 106. The operational systems 106 may include, but are not limited to, any automatic or manual systems that may be used to enhance the ego agent 202, a training agent, operation, and/or propulsion. The operational systems 106 include an execution module 128. The execution module 128 may monitor, analyze, and/or operate the ego agent 202, to some degree based on the training received via the training module 124 and corresponding neural network. For example, the execution module 128 may store, calculate, and provide directional information and facilitate features like vectoring and obstacle avoidance among others based on a training dataset. In a vehicular embodiment, the execution module 128 may provide operational data to agent systems, such as the steering system, that cause the ego agent 202 to operate autonomously. In some embodiments, the execution module 128 may be a Proportional, Integral, Derivative (PID) controller. Continuing the vehicular embodiment described above, the execution module 128 may be a longitudinal PID controller. The operational systems 106 may be dependent on the implementation.

The operational systems 106 include and/or are operably connected for computer communication to the sensor module 102. For example, one or more sensors of the sensor module 102, such as the image sensor 204, may be incorporated with execution module 128 to monitor characteristics of the environment of the ego agent 202 or the ego agent 202 itself. For example, in the vehicular embodiment, the image sensor 204 may be incorporated with execution module 128 to monitor characteristics of the at least one roadway environment 200. Suppose that the execution module 128 is facilitating execution of a right turn onto a street. The execution module 128 may receive sensor data 110 from the sensor module 102 to confirm that vehicles present on the street are yielding as expected.

The sensor module 102, the computing device 104, and/or the operational systems 106 are also operatively connected for computer communication to the network 130. The network 130 is, for example, a data network, the Internet, a wide area network (WAN) or a local area (LAN) network. The network 130 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Training a Neural Network

Figure 3:
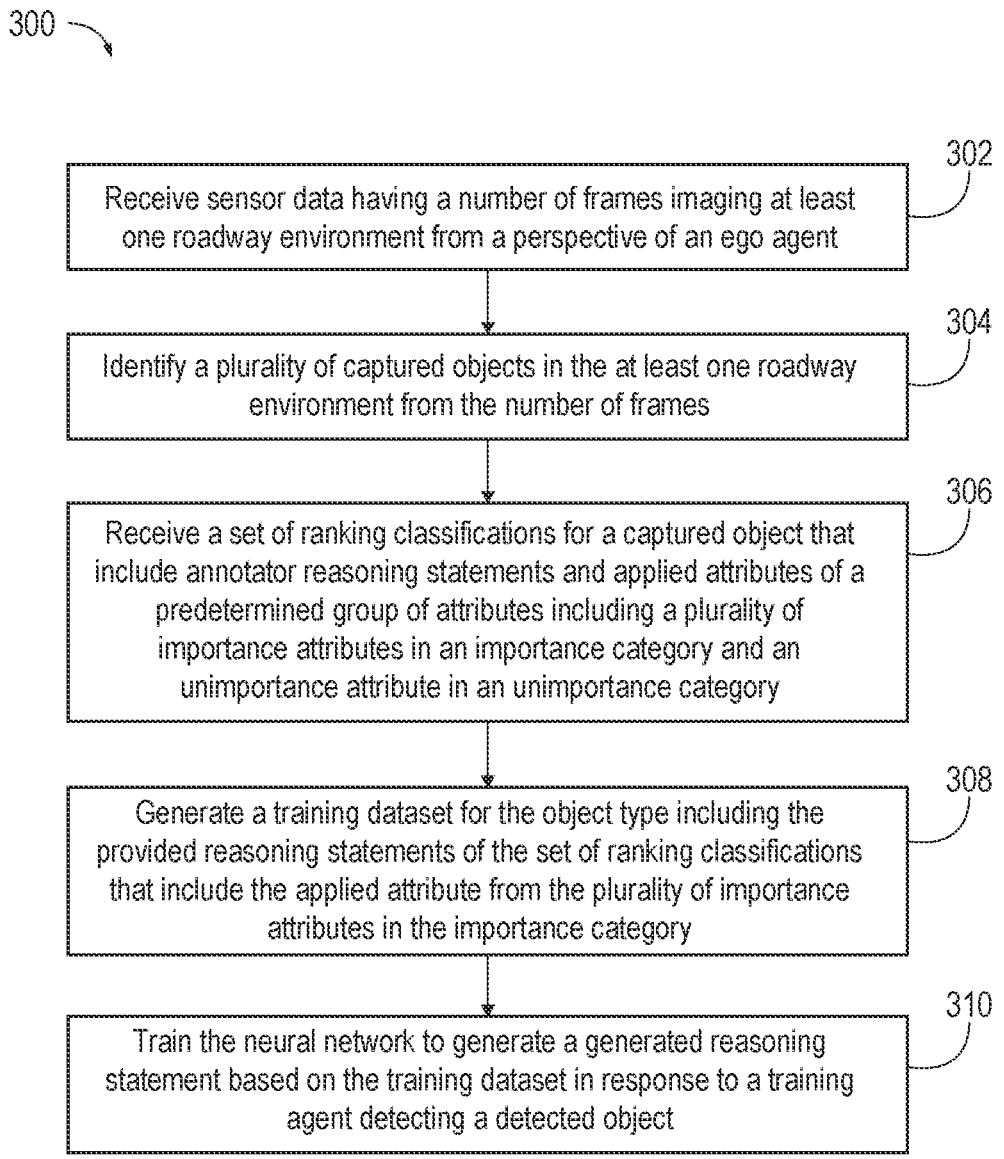
FIG. 3 is an exemplary process flow of a method for training a neural network for generating a reasoning statement, according to one aspect.
Figure 4:
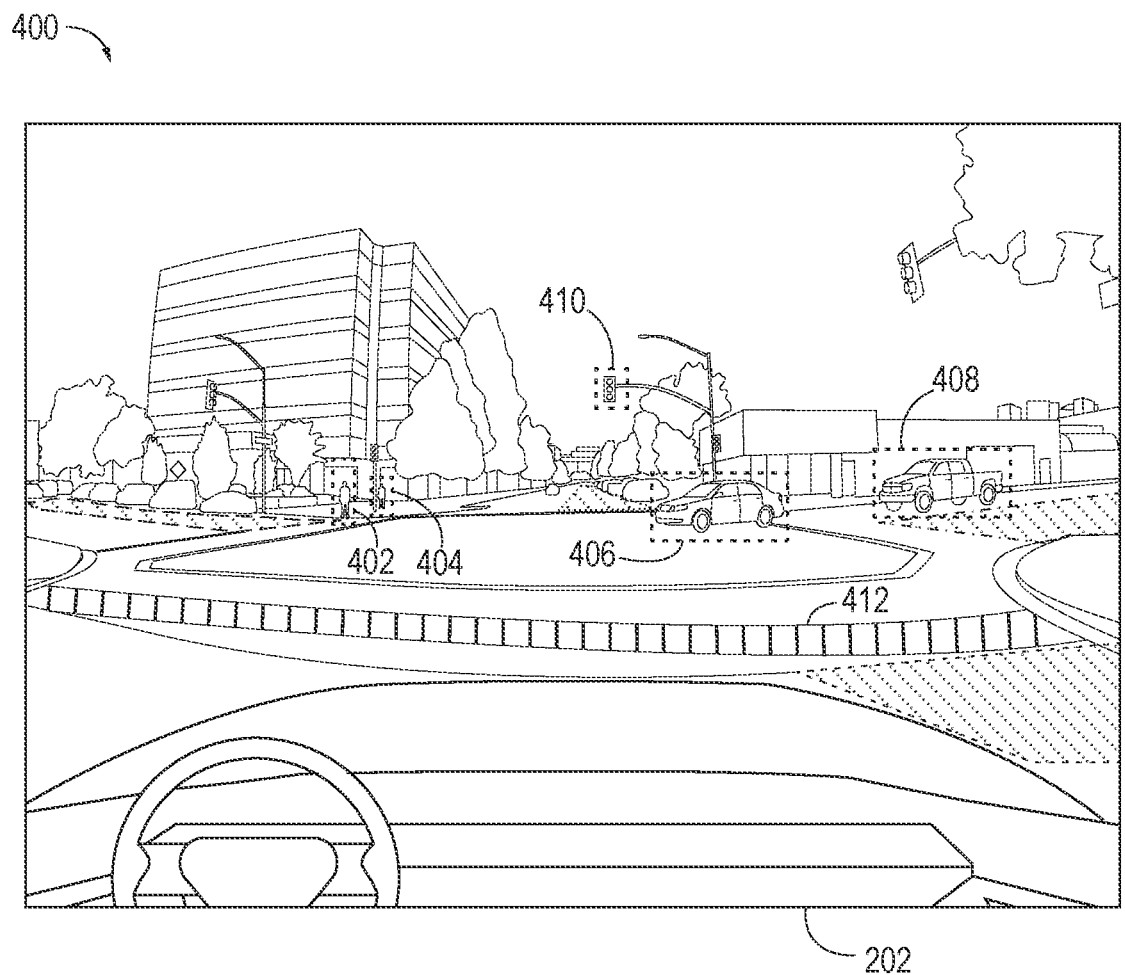
FIG. 4 is a generated segmentation corresponding to an input image of agent environment, according to one aspect.

Referring now to FIG. 3, a method 300 for training a neural network for generating a reasoning statement will now be described according to an exemplary embodiment. FIG. 3 will also be described with reference to FIGS. 1, 2, and 4-7. For simplicity, the method 300 will be described as a sequence of blocks, but it is understood that the blocks of the method 300 may be organized into different architectures, elements, stages, and/or processes.

At block 302, the method 300 includes the sensor module 102 receiving the sensor data 110 that has a number of frames imaging the at least one roadway environment 200 from a perspective of an ego agent 202. The sensor data 110 may be received from the image sensor 204. The sensor data 110 may include a video sequence or a series of images, user inputs, and/or data from the operational systems 106. In one embodiment, the sensor data 110 includes an input frame 400, shown in FIG. 4. The input frame 400 may be a perspective space image defined relative to the position and viewing direction of the ego agent 202. The input frame 400 may be a frame of a series of frames selected from the sensor data 110, for example, a video dataset such as a video clip.

The sensor data 110 may also include intrinsic parameters associated with the image sensor 204. The sensor data 110 may be received from the image sensor 204. The image sensor 204 may include radar units, lidar units, image capture components, sensors, cameras, scanners (e.g., 2-D scanners or 3-D scanners), or other measurement components. In some embodiments, the sensor data 110 is augmented with additional sensor data from other sources is received. For example, the sensor data 110 from the image sensor 204 may be augmented by other sources, such as a second optical sensor (not shown), and/or remote devices (e.g., via the bus 108 and/or the communication interface 118).

At block 304, the method 300 includes the feature module 120 identifying a plurality of captured objects in the at least one roadway environment 200 from a number of frames, such as the input frame 400. The plurality of captured objects may be identified by extracting features from the input frame 400. A feature is a piece of information about the content of the input frame 400 received as sensor data 110. For example, the features may include information about captured objects including a first pedestrian 402, a second pedestrian 404, a first proximate vehicle 406, a second proximate vehicle 408, a traffic light 410, and a crosswalk 412. The features may also include information regarding the relative position between the captured objects 402-412 and the ego agent 202.

In one or more embodiments, the feature module 120 may include or access the neural network 152 configured to utilize machine learning/deep learning to provide artificial intelligence capabilities that may be utilized to build and maintain the neural network deep learning database 156 stored in the data store 116 or remotely for storing various types of data. The neural network of the feature module 120 may process the sensor data 110 that is provided as inputs and may utilize the neural network deep learning database 156 to access stored computer/machine learned data to determine the object types associated with the captured objects 402-412. In particular, upon receiving sensor data 110, the feature module 120 may determine object type based on the sensor data 110. The object types of the captured objects 402-412 may be based on the physical environment, such as the at least one roadway environment 200. For example, in the vehicular embodiment, the features may include the number and width of lanes, distance to various types of intersections, crosswalks, and sidewalks, and road user type (e.g., pedestrian, personal vehicle, commercial vehicle, sedan, light-duty truck, etc.), among others.

At block 306, the method 300 includes the ranking classification module 122 receiving a set of ranking classifications for a captured object of the plurality of captured objects 402-412. The ranking classification module 122 receives a number or ranking classifications for the set of ranking classifications. The ranking classifications may be received from a number of different sources. For example, the ranking classifications may be received from a number of annotators. The annotators may be human or machine. For example, five human annotators may each provide a ranking classification for the first proximate vehicle 406.

A ranking classification of the set of ranking classifications includes an annotator reasoning statement and an applied attribute of a predetermined group of attributes including a plurality of importance attributes in an importance category and an unimportance attribute in an unimportance category. Turning first to the applied attribute, the predetermined group of attributes provide a standardized framework for assessing the importance of a captured object to the ego agent 202. For example, the importance category may include importance attributes, such as, a high importance attribute, a medium importance attribute, and low importance attribute. The importance attributes of the importance category indicate that the captured object may affect the navigation, path planning, or other autonomous functioning of the ego agent 202. For example, one or more annotators may select the high importance attribute as the applied attribute for the first proximate vehicle 406 because the first proximate vehicle 406 is moving into the intersection of the at least one roadway environment 200 and may intersect with a planned path of the ego agent.

The unimportance attribute in an unimportance category indicates that the captured object of the plurality of captured objects 402-412 is not relevant to the navigation, path planning, or other autonomous functioning of the ego agent 202. For example, one or more annotators may select the unimportance attribute for the second pedestrian 404 based on the proximity of the second pedestrian 404 to buildings and the distance of the second pedestrian 404 from the roadway. In some embodiments, the feature module 120 may further distinguish between children and adults as captured objects 402-412. The annotators may select an importance attribute as the applied attribute for the second pedestrian 404 if the second pedestrian is a child but select the unimportance attribute as the applied attribute if the second pedestrian is an adult, due to unpredictability of children.

In addition to dynamic captured objects, such as pedestrians (e.g., the first pedestrian 402 and the second pedestrian 404) and proximate vehicles (e.g., the first proximate vehicle 406 and the second proximate vehicle 408), static objects such as roadside equipment (e.g., the traffic light 410) and roadway features (e.g., the crosswalk 412) may receive ranking classifications. In this manner, the annotators may select an applied attribute from the predetermined group of attributes to indicate the overall importance of one or more of the captured objects of the plurality of captured objects 402-412.

The ranking classification may also include object-level attributes for one or more of the captured objects of the plurality of captured objects 402-412. The ranking classification module 122 may receive the object-level attributes to identify additional details for why an annotator regards the captured object as important. Like the applied attribute, the object-level attributes may be selected from a predetermined number of object-level attributes. The object-level attributes may be selected from a predetermined number of object-level attributes are selectable to provide a standardized framework for the object-level attributes. The object-level attributes may include the object type, visual attributes, action attributes, location attributes, direction attributes of the captured object, and a response of the ego agent 202 to the captured object, among others. Accordingly, the object-level attributes provide a reasoning for the applied attribute according to the standardized framework.

The object-level attributes may include the object type of the captured object (e.g., pedestrian, bicyclist, vehicle, roadside equipment, roadway feature, etc.). The object-level attributes may also include visual and action attributes of the captured object. The visual attributes may describe color, outfit, accessories, (e.g., carrying a backpack, using a wheelchair), age (e.g., child, adult, senior, etc.), type of vehicle (e.g., sedan, sport utility vehicle, emergency vehicle, etc.) and type of sign (e.g., traffic light, stop sign, speed limit sign, etc.), among others. The action attributes may include walking, jaywalking, looking at the ego agent 202, not looking at the ego agent 202, looking into a portable device, talking on a portable device, taking in a group, parked, stopped, moving, turning, etc. As described above with respect to the second pedestrian 404, the age of the second pedestrian may affect the selection of the applied attribute from the importance category or the unimportance category. By including the visual attribute of age as an object-level attribute in the ranking classifications, additional information that explains the applied attribute is provided that comports with a standardized framework.

The location and direction attributes of the captured object may include relative distances and coordinate as well as vectoring information for the captured object. The location attributes may also include attributes in plain language. For example, the location attributes may include ego lane of the ego agent 202, adjacent lane to the ego lane of the ego agent, left lane, center lane, right lane, crosswalk, and sidewalk among others. Likewise, the direction attributes may be provided in plain language intended to be understood by a human and include toward the ego agent 202, away from the ego agent 202, toward the intersection, away from the intersection, etc. For example, an annotator may select a high importance attribute for the first pedestrian 402 and also select object-level attributes for the first pedestrian 402 that indicate that the first pedestrian 402 is moving into the at least one roadway environment 200.

The response attributes by the ego agent 202 to the captured object may include passing by, following, stopping yielding, slowing down, accelerating, and no-response, among others. Accordingly, while the other object-level attributes characterize the captured object, the object-level attributes may include information that characterizes the ego agent 202.

The annotator reasoning statement of the ranking classification is a natural language explanation for the applied attribute provided by the annotator. Unlike the importance attributes, unimportance attributes, and object-level attributes, a standardized framework is not used for the annotator reasoning statement provided by the annotator. Instead, the annotator reasoning statement is a free-form response from the annotator to explain why a specific importance attributes or unimportance attribute is selected as the applied attribute.

In one embodiment, the ranking classification module 122 may prompt a response to the annotator reasoning statement with a question, such as "why is the captured object of high importance, medium importance, low importance, or non-importance." The ranking classification module 124 may prompt annotator reasoning statement in response to an applied attribute from the importance category of the predetermined group of attributes. For example, if the annotator selects a high importance attribute, a medium importance attribute, or a low importance attribute as the applied attribute, the ranking classification module 122 may prompt the annotator for an annotator reasoning statement. However, if the annotator selects the unimportance attribute as the applied attribute, the ranking classification module 122 may not prompt the annotator for an annotator reasoning statement.

At block 308, the method 300 includes the training module 124 generating a training dataset 158 for the object type. The training dataset 158 includes the annotator reasoning statements of the set of ranking classifications and the applied attribute from the plurality of importance attributes in the importance category. The training dataset 158 includes the correspondence between the applied attribute of a ranking classification of an annotator with the annotator reasoning statement of that annotator. In this manner, the training dataset 158 identifies how different annotators have selected an applied attribute within the standardized framework as well as the annotator reasoning statement in the annotator's own words. Thus, the training dataset 158 is generated to train the neural network 152 based on both the applied attributes within the standardized framework and a diversity of annotator reasoning statements.

As discussed above, in some embodiments, the annotators may be human. The plurality of human annotators may be grouped based on one or more shared demographic attributes. For example, annotators may share an age range, such as thirty-five to forty-four years of age, gender, socioeconomic standing, residential region, level of education, etc. The annotators with one or more shared demographic attributes may similarly assess the importance of a captured object. Thus, the training dataset 158 may include the annotator reasoning statements based on the demographic attributes of the human annotators.

At block 310, the method 300 includes the training module 124 training the neural network 152 to generate a generated reasoning statement based on the training dataset 158 in response to a training agent detecting a detected object of the object type. In one embodiment, upon generating the training dataset 158 the neural network 152 may be trained by causing the neural network processing unit 154 to evaluate the diversity annotator reasoning statements for each applied attribute. For example, the training module 124 may cause the neural network 152 to differentiate the annotator reasoning statements for the first proximate vehicle 406 that have an applied attribute that is the high importance attribute from the medium importance attribute, and further from the low importance attribute. In one embodiment, the differentiated annotator reasoning statements may be organized and stored by the neural network deep learning database 156.

The training module 124 may additionally parse the annotator reasoning statements to identify specific words, phrases, or statements based on the applied attribute of the ranking classification. For example, the training module 124 may determine a threshold number of terms, such as the top thirty terms, for annotator reasoning statements. The training module 124 may determine the top thirty terms for the high importance attribute based on the frequency of the terms in the annotator reasoning statements of ranking classifications including the applied attribute of the high importance attribute. The training module 124 may further parse the annotator reasoning statements based on object-type or object-level attribute. Thus, the training module 124 may train the neural network 152 by parsing the annotator reasoning statements and updating the neural network deep learning database 156.

In one embodiment, the training module 124 may determine annotator reasoning statements have not been received for an object type. Accordingly, the training module 124 may train the neural network 152 by updating the neural network deep learning database 156 with the annotator reasoning statements to ensure that the neural network 152 may be used to generate generated reasoning statements for objects of that object type. Thus, the training module 124 may train the neural network 152 by updating the neural network deep learning database 156 with additional annotator reasoning statements.

In another embodiment, the neural network 152 may be trained to be utilized with a training agent, such as the ego agent 202, to improve the ability of the training agent to generate reasoning statements for a user. The training agent may display the generated reasoning statement on a display associated with an infotainment system or other agent system of the training agent. The training agent may be associated with a user profile of a user of the training agent. The user profile may include information about the user such as the age, gender, socioeconomic standing, residential region, level of education, etc. of the user.

The training module 124 may also train the neural network 152 to generate a generated ranking classification based on the training dataset 158 in response to a training agent detecting a detected object of the object type. The generated ranking classification may be generated independently of the generated reasoning statement or with the generated reasoning statement in a joint model. The generated ranking classification may be based on the applied attributes.

The neural network 152 may be trained based on the user profile. For example, the neural network processing unit 154 may update the neural network deep learning database 156 with the annotator reasoning statements of annotators that have one or more of the demographic attributes corresponding to the user profile of the user. For example, the user profile may include information identifying the user as a man that is forty years old, then the neural network deep learning database 156 may be updated with annotator reasoning statements from annotators that have similar demographic attributes, such as an age range of thirty-five to forty-four years old and/or male. Thus, the training of the neural network 152 of the training agent may be tailored to the user.

Figure 5:
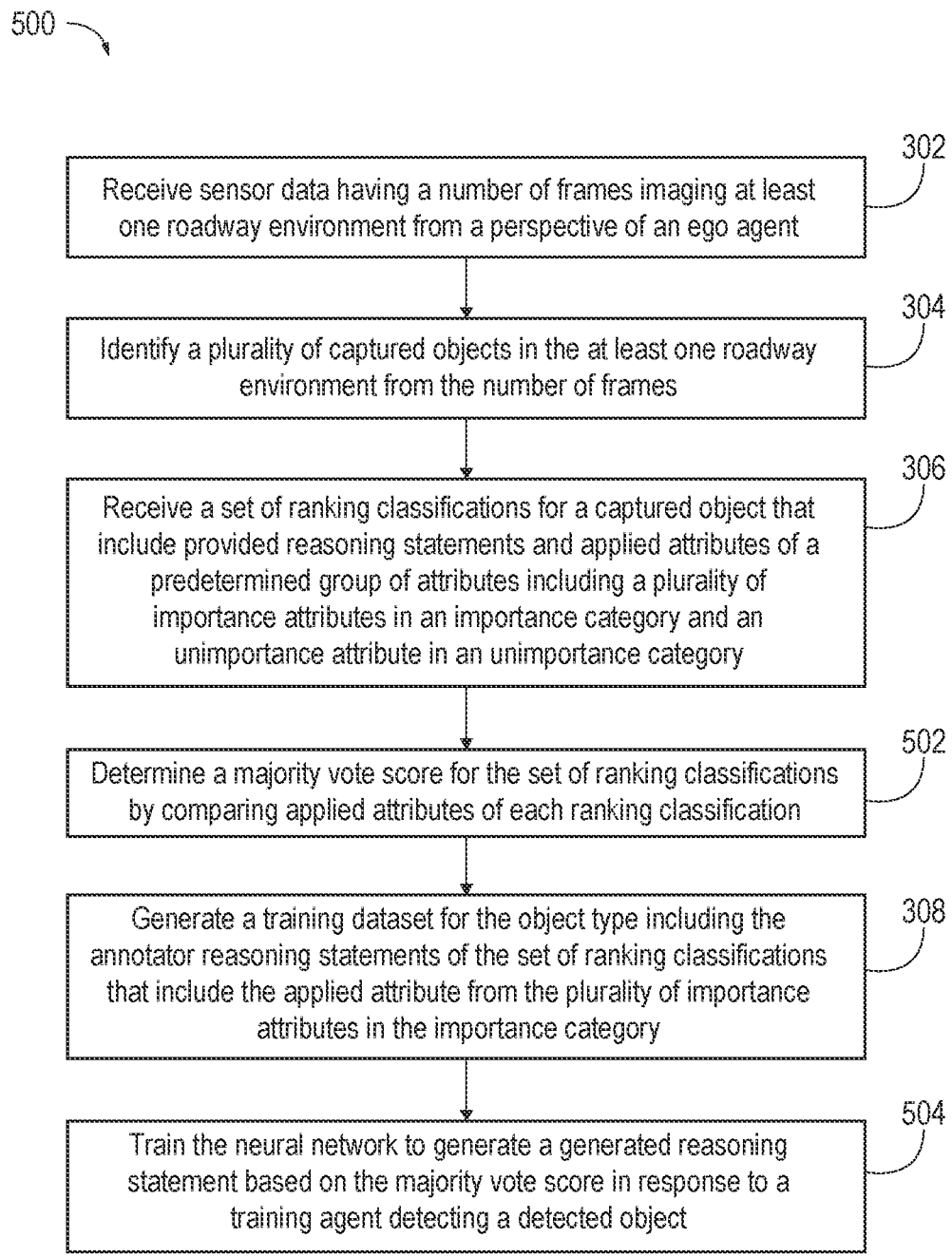
FIG. 5 is an exemplary process flow of another method for training a neural network for generating a reasoning statement, according to one aspect.

Referring now to FIG. 5, another method 500 for training a neural network for generating a reasoning statement will now be described according to an exemplary embodiment. FIG. 5 will also be described with reference to FIGS. 1-4, 6, and 7. For simplicity, the method 500 will be described as a sequence of blocks, but it is understood that the blocks of the method 300 may be organized into different architectures, elements, stages, and/or processes.

At block 302, the method 500 includes the sensor module 102 for receiving receive the sensor data 110 having a number of frames imaging the at least one roadway environment 200 from a perspective of an ego agent 202. The sensor data 110 may be received from the image sensor 204. As discussed above with respect to the method 300 of FIG. 3, the sensor data 110 may include a video sequence or a series of images, user inputs, and/or data from the operational systems 106. For example, the sensor data 110 may include a number of input frames, such as the input frame 400.

At block 304, the method 500 includes the feature module 120 for identifying a plurality of captured objects in the at least one roadway environment 200 from a number of frames, such as the input frame 400. In the manner described above with respect to the method 300 of FIG. 3, the plurality of captured objects 402-412 may be identified by extracting features. Additionally, the feature module 120 may determine an object type of the captured objects 402-412 based on the sensor data 110 and, for example, a neural network deep learning database stored in the data store 116.

At block 306, the method 500 includes the ranking classification module 122 for receiving a set of ranking classifications for a captured object of the plurality of captured objects 402-412. As discussed above with respect to the method 300, the ranking classifications each include an applied attribute and an annotator reasoning statement for each object of the plurality of captured objects 402-412. The ranking classifications may also include object-level attributes for captured objects of the plurality of captured objects 402-412.

At block 502, the method 500 includes the scoring module 126 for determining a majority vote score for the set of ranking classifications by comparing applied attributes of each ranking classification. In some embodiments, the scoring module 126 compares the applied attributes to determine a majority of an importance attribute of the importance category or the unimportance attribute of the unimportance category in the set of ranking classifications. For example, if there are five annotators that each provide a ranking classification for a captured object, the five applied attributes of the ranking classifications may include one high importance attribute, two medium importance attributes, one low importance attribute, and one non-importance attribute. The scoring module 126 may then determine that the majority of applied attributes are medium importance attributes.

In one embodiment, the scoring module 126 may determine the majority vote score for applied attributes in the importance category. In another example, if there are five annotators and three importance attributes in the importance category, then a 20% majority vote score indicates that each annotator provided a different applied attribute from the importance category for a captured object, 60% majority vote score indicates that three out of five annotators provided the same applied attribute from the importance category for a captured object, and 100% majority vote score indicates that all five annotators agreed on the same applied attribute from the importance category for a captured object.

At block 308, the method 500 includes the training module 124 for generating a training dataset 158 for the object type. The training dataset 158 includes the annotator reasoning statements of the set of ranking classifications and the applied attribute from the plurality of importance attributes in the importance category. The training dataset 158 includes the correspondence between the applied attribute of a ranking classification of an annotator with the annotator reasoning statement of that annotator.

In some embodiments, the training module 124 may apply weights to the annotator reasoning statements included in the training dataset based on the majority vote score. The weights may correspond to the majority vote score. Continuing the example from above, if each annotator provided a different applied attribute from the importance category for a captured object, then a 20% weight may be applied to each annotator reasoning statements corresponding to each annotator. If three out of five annotators provided the same applied attribute from the importance category for a captured object, then a weight of 60% may be applied to the three annotator reasoning statements corresponding to the three out five annotators. The 20% weight may be applied to each annotator reasoning statements corresponding to remaining two of the five annotators. If each annotator provided a same applied attribute from the importance category for a captured object, then a 100% weight may be applied to each annotator reasoning statements corresponding to each annotator. In this manner, the weight is indicative of a level of confidence in the applied attribute out of 100% based on consistency of the applied attributes among the annotators.

In another embodiment, the majority vote score may be based on the importance category for the captured object having the majority of applied attributes. For example, if the majority of annotators, such as three of five annotators, provided a high importance attribute and the minority of annotators, such as two of five annotators, provided a medium importance attribute, then the majority vote score for the captured object may be 100% a high importance attribute. In this manner, the majority vote score may identify the importance category having the majority of applied attributes based on the number of annotators.

Accordingly, the majority voting score more accurately reflects the final ground truth importance.

At block 504, the method 500 includes the training module 124 for training the neural network 152 to generate a generated reasoning statement based on the training dataset 158. In one embodiment, the differentiated annotator reasoning statements may be organized and stored based on the weights by the neural network deep learning database 156. In this manner, the neural network 152 may be trained in a diversity of annotator reasoning statements, supported by the standardized framework of the applied attributes and a confidence estimation of the applied attributes. Accordingly, the trained neural network is trained to generate generated reasoning statements for object types based on the annotator reasoning statements, supported by the standardized framework of the applied attributes and a confidence estimation of the applied attributes. The generated reasoning statements with the training dataset 158 that improve the transparency and interpretability of the visual scene understanding modules of agent systems.

Figure 6:
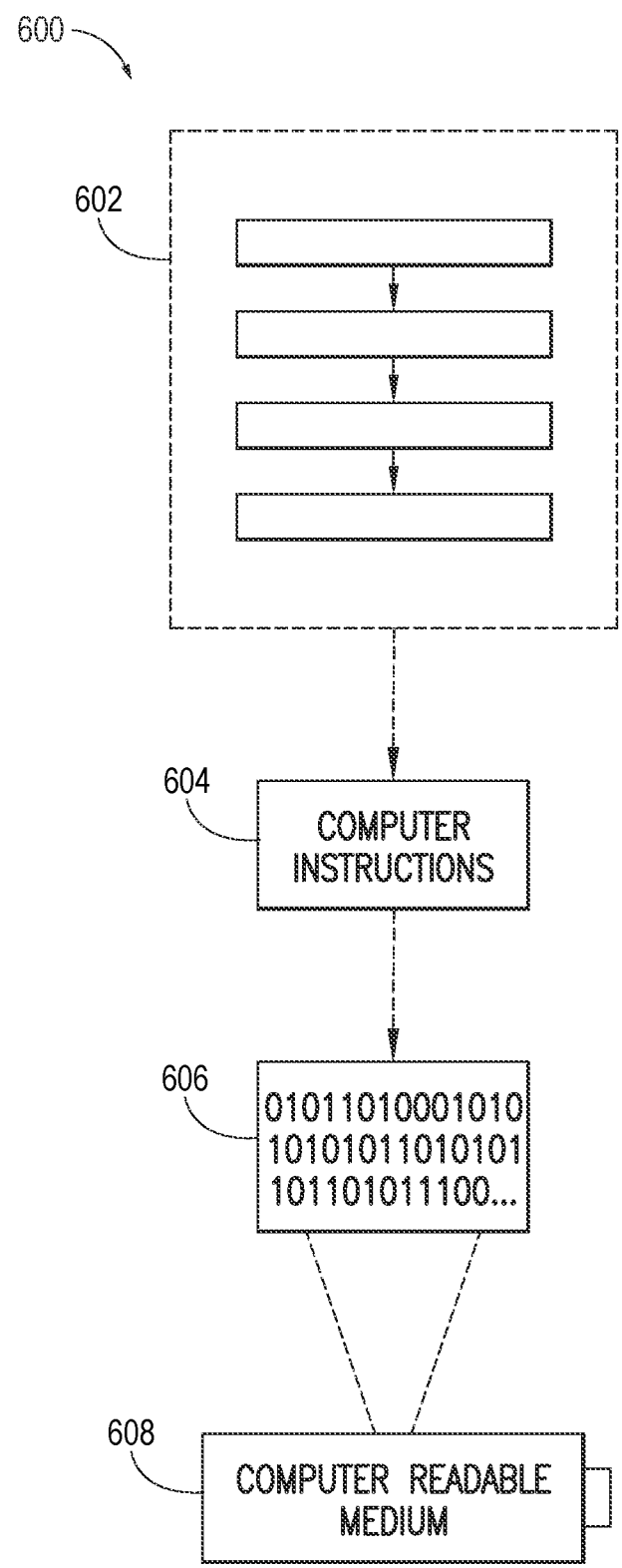
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and the method 500 of FIG. 5. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
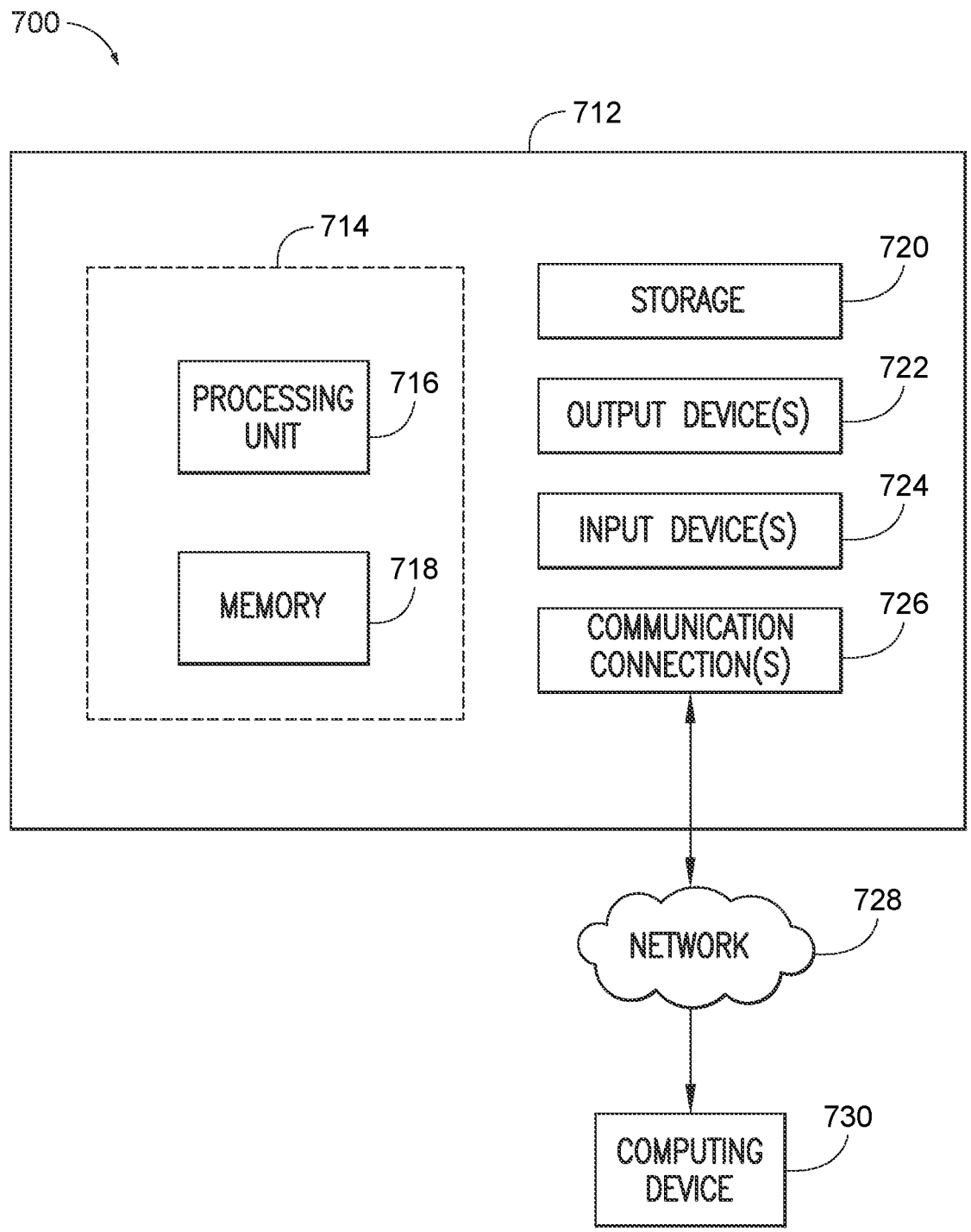
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for training a neural network for generating a reasoning statement, comprising:
 a memory storing instructions that when executed by a processor cause the processor to:
  receive sensor data having a number of frames imaging at least one roadway environment from a perspective of an ego agent;
  identify a plurality of captured objects in the at least one roadway environment from the number of frames;
  receive a set of ranking classifications for a captured object, having an object type, of the plurality of captured objects, wherein a ranking classification of the set of ranking classifications includes an annotator reasoning statement and an applied attribute of a predetermined group of attributes including a plurality of importance attributes in an importance category and an unimportance attribute in an unimportance category, wherein the annotator reasoning statement is a natural language explanation for the applied attribute, and wherein each ranking classification is received from a different source of a plurality of sources;
  generate a training dataset for the object type including the annotator reasoning statements of the set of ranking classifications that include the applied attribute from the plurality of importance attributes in the importance category; and
  train the neural network to generate a generated reasoning statement based on the training dataset in response to a training agent detecting a detected object of the object type.

2. The system of claim 1, further comprising instructions that when executed by the processor cause the processor to:
 determine a majority vote score for the set of ranking classifications by comparing applied attributes of each ranking classification.

3. The system of claim 2, wherein comparing the applied attributes includes determining a majority of an importance attribute of the importance category or the unimportance attribute of the unimportance category in the set of ranking classifications.

4. The system of claim 2, further comprising instructions that when executed by the processor cause the processor to:
 applying weights to the annotator reasoning statements included in the training dataset based on the majority vote score.

5. The system of claim 1, wherein the plurality of sources includes a number of human annotators that share one or more demographic attributes.

6. The system of claim 5, wherein the training agent is associated with a user profile of a user of the training agent, and wherein the user profile includes one or more of the demographic attributes.

7. The system of claim 1, wherein the sensor data includes image data from a plurality of agent sensors of the ego agent.

8. A computer-implemented method for training a neural network for generating a reasoning statement, comprising:
 receiving sensor data having a number of frames imaging at least one roadway environment from a perspective of an ego agent;
 identifying a plurality of captured objects in the at least one roadway environment from the number of frames;
 receiving a set of ranking classifications for a captured object, having an object type, of the plurality of captured objects, wherein a ranking classification of the set of ranking classifications includes an annotator reasoning statement and an applied attribute of a predetermined group of attributes including a plurality of importance attributes in an importance category and an unimportance attribute in an unimportance category, wherein the annotator reasoning statement is a natural language explanation for the applied attribute, and wherein each ranking classification is received from a different source of a plurality of sources;

generating a training dataset for the object type including the annotator reasoning statements of the set of ranking classifications that include the applied attribute from the plurality of importance attributes in the importance category; and training the neural network to generate a generated reasoning statement based on the training dataset in response to a training agent detecting a detected object of the object type.

9. The computer-implemented method of claim 8, further comprising:

determining a majority vote score for the set of ranking classifications by comparing applied attributes of each ranking classification.

10. The computer-implemented method of claim 9, wherein comparing the applied attributes includes determining a majority of an importance attribute of the importance category or the unimportance attribute of the unimportance category in the set of ranking classifications.

11. The computer-implemented method of claim 9, further comprising:

applying weights to the annotator reasoning statements included in the training dataset based on the majority vote score.

12. The computer-implemented method of claim 8, wherein the plurality of sources includes a number of human annotators that share one or more demographic attributes.

13. The computer-implemented method of claim 12, wherein the training agent is associated with a user profile of a user of the training agent, and wherein the user profile includes one or more of the demographic attributes.

14. The computer-implemented method of claim 8, wherein the sensor data includes image data from a plurality of agent sensors of the ego agent.

15. A non-transitory computer readable storage medium storing instructions that when executed by a computer having a processor to perform a method for training a neural network for generating a reasoning statement, the method comprising:

receiving sensor data having a number of frames imaging at least one roadway environment from a perspective of an ego agent;

identifying a plurality of captured objects in the at least one roadway environment from the number of frames;

receiving a set of ranking classifications for a captured object, having an object type, of the plurality of captured objects, wherein a ranking classification of the set of ranking classifications includes an annotator reasoning statement and an applied attribute of a predetermined group of attributes including a plurality of importance attributes in an importance category and an unimportance attribute in an unimportance category, wherein the annotator reasoning statement is a natural language explanation for the applied attribute, and wherein each ranking classification is received from a different source of a plurality of sources;

generating a training dataset for the object type including the annotator reasoning statements of the set of ranking classifications that include the applied attribute from the plurality of importance attributes in the importance category; and training the neural network to generate a generated reasoning statement based on the training dataset in response to a training agent detecting a detected object of the object type.

16. The non-transitory computer readable storage medium implemented method of claim 15, further comprising:

determining a majority vote score for the set of ranking classifications by comparing applied attributes of each ranking classification.

17. The non-transitory computer readable storage medium implemented method of claim 16, wherein comparing the applied attributes includes determining a majority of an importance attribute of the importance category or the unimportance attribute of the unimportance category in the set of ranking classifications.

18. The non-transitory computer readable storage medium implemented method of claim 16, further comprising:

applying weights to the annotator reasoning statements included in the training dataset based on the majority vote score.

19. The non-transitory computer readable storage medium implemented method of claim 15, wherein the plurality of sources includes a number of human annotators that share one or more demographic attributes.

20. The non-transitory computer readable storage medium implemented method of claim 19, wherein the training agent is associated with a user profile of a user of the training agent, and wherein the user profile includes one or more of the demographic attributes.

* * * * *